(12) United States Patent
Shah et al.

(10) Patent No.: US 12,006,214 B2
(45) Date of Patent: Jun. 11, 2024

(54) INTEGRATION OF A HOT OXYGEN BURNER WITH AN AUTO THERMAL REFORMER

(71) Applicants: Minish Mahendra Shah, East Amherst, NY (US); Lawrence Bool, East Aurora, NY (US)

(72) Inventors: Minish Mahendra Shah, East Amherst, NY (US); Lawrence Bool, East Aurora, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 125 days.

(21) Appl. No.: 17/211,148

(22) Filed: Mar. 24, 2021

(65) Prior Publication Data
US 2021/0206633 A1 Jul. 8, 2021

Related U.S. Application Data

(63) Continuation of application No. 15/905,292, filed on Feb. 26, 2018, now abandoned.

(51) Int. Cl.
*C01B 3/36* (2006.01)
*C01B 3/38* (2006.01)

(52) U.S. Cl.
CPC .............. *C01B 3/363* (2013.01); *C01B 3/382* (2013.01); *C01B 2203/0211* (2013.01);
(Continued)

(58) Field of Classification Search
CPC ............ C01B 3/382; C01B 2203/0244; C01B 2203/0233; C01B 2203/1241; C01B 2203/0261; C01B 2203/142; C01B 2203/0283; C01B 2203/0844; C01B 2203/0255; C01B 3/36; C01B 2203/0811; C01B 2203/82; C01B 2203/062; C01B 3/38; C01B 2203/143; C01B 2203/1235; C01B 3/386; C01B 2203/1276; C01B 2203/141; C01B 2203/148; C01B 2203/0883; C01B 2203/1258; Y02P 20/10; Y02P 20/129; Y02P 10/25; Y02P 30/00; Y02P 70/50; Y02P 20/145; Y02P 20/582; Y02P 30/20; Y02P 10/122; Y02P 10/134; Y02P 20/50; Y02P 20/00; Y02P 20/141; Y02P 30/40; Y02P 20/133; B01J 8/067; B01J 2219/00006; B01J 2219/00159; B01J 8/0285; B01J 2208/0053; B01J 23/755; B01J 12/007; B01J 2219/00103;
(Continued)

(56) References Cited

U.S. PATENT DOCUMENTS 4,986,748 A * 1/1991 Brown ................. F27B 3/22
239/424
7,255,840 B2 8/2007 Papavassiliou et al.
(Continued)

FOREIGN PATENT DOCUMENTS

AU 2007276585 A1 1/2008
CA 2550047 A1 6/2005
(Continued)

*Primary Examiner* — Kaity V Chandler
(74) *Attorney, Agent, or Firm* — Iurie A. Schwartz

(57) ABSTRACT

The present invention relates to integrating a hot oxygen burner with an auto thermal reformer of reducing in a system for generating synthesis gas.

3 Claims, 11 Drawing Sheets

(52) U.S. Cl.
CPC ............... *C01B 2203/0216* (2013.01); *C01B 2203/0244* (2013.01); *C01B 2203/0811* (2013.01); *C01B 2203/0827* (2013.01); *C01B 2203/1241* (2013.01)

(58) Field of Classification Search
CPC ...... B01J 23/40; B01J 8/0278; B01J 37/0215; B01J 19/2485; B01J 2208/00256; B01J 2219/00157; B01J 2219/2453; B01J 2219/24

See application file for complete search history.

(56) References Cited

U.S. PATENT DOCUMENTS

| | | | | |
|---|---|---|---|---|
| 8,648,006 | B2 * | 2/2014 | Daly | B01J 19/0053 |
| | | | | 423/245.3 |
| 9,540,240 | B2 | 1/2017 | Damstedt et al. | |
| 9,574,769 | B2 * | 2/2017 | Ponzi | F23L 7/00 |
| 9,896,626 | B1 * | 2/2018 | Schuetzle | C01B 13/0251 |
| 2003/0046868 | A1 * | 3/2003 | Lewis | C10K 1/101 |
| | | | | 48/199 FM |
| 2004/0226217 | A1 * | 11/2004 | Ahmed | C01B 3/382 |
| | | | | 48/119 |
| 2005/0188615 | A1 | 9/2005 | Sennoun et al. | |
| 2005/0217178 | A1 | 10/2005 | Aoyama | |
| 2006/0037308 | A1 | 2/2006 | Kamijo et al. | |
| 2007/0084118 | A1 | 4/2007 | Kaeding et al. | |
| 2007/0237710 | A1 | 10/2007 | Genkin | |
| 2014/0367614 | A1 * | 12/2014 | Damstedt | C01B 3/36 |
| | | | | 252/373 |
| 2018/0073726 | A1 * | 3/2018 | Takeshima | F23C 7/008 |

FOREIGN PATENT DOCUMENTS

| | | | | |
|---|---|---|---|---|
| CA | 2582999 | A1 | 10/2007 | |
| CN | 1662441 | A | 8/2005 | |
| CN | 101049908 | A | 10/2007 | |
| DE | 102006033441 | A | 1/2008 | |
| TW | 299537377 | A | 12/2005 | |
| WO | 2004/062788 | A1 | 7/2004 | |
| WO | WO-2005021422 | A1 * | 3/2005 | ............... C01B 3/26 |
| WO | 2005/058751 | A2 | 6/2005 | |
| WO | 2008/009250 | A1 | 1/2008 | |
| WO | 2008000224 | A1 | 1/2008 | |

* cited by examiner

INTEGRATION OF A HOT OXYGEN BURNER WITH AN AUTO THERMAL REFORMER

CROSS REFERENCE TO RELATED APPLICATION

This application is a continuation of prior U.S. application Ser. No. 15/905,292, filed Feb. 26, 2018, which is incorporated herein by reference.

FIELD OF THE INVENTION

The present invention relates to a novel system and process for integrating a hot oxygen burner with an auto thermal reformer for reducing capital expenditure as compared to existing partial oxidation and autothermal reformer systems. The system also reduces oxygen utilization and soot formation as compared to existing partial oxidation system and keeps soot formation to at or below the levels in existing autothermal reformer system. Specifically, the system reduces the sizes of pre-reformer and fired heater or eliminates the need for pre-reformers and/or fired heater entirely. The system further enables the use of 'opportunity fuels' (as defined below) in the ATR.

DESCRIPTION OF RELATED ART

Hydrocarbons such as natural gas, naphtha, or liquefied petroleum gas (LPG) can be catalytically converted with steam to obtain a synthesis gas (i.e., a mixture of hydrogen (Hz) and carbon monoxide (CO), commonly referred to as synthesis gas or syngas. This reforming process could be done through the use of a so-called steam methane reforming, or alternatively, partial oxidation and auto thermal reforming processes. These generation systems are known, and are typically utilized to obtain syngas which may be ultimately utilized in the production of hydrogen, methanol, ammonia, or other chemicals. These partial oxidation ("POx") and auto thermal reforming ("ATR") systems typically generating syngas with a low $H_2$:CO ratio in the range of about 1.5 to 2.5. The ATR system requires multiple process steps and pieces of equipment to carry out reforming resulting in capital intensive processes. The POx system, on the other hand, requires single process step for reforming. However, the POx system consumes ~20-30% more oxygen than the ATR system per unit volume of syngas and it requires more expensive specialized boiler due to higher temperature of syngas exiting the POx reactor (2500-2700° F. vs. 1800-1900° F. for ATR) and soot formation within the reactor.

For instance, employees of the assignee developed a hot oxygen burner based POx technology that drives rapid mixing in the POx reactor using a hot oxygen jet and a patented technique to minimize soot within the POx reactor. This is shown in U.S. Pat. No. 9,540,240. However, HOB-based POx systems exhibit the same disadvantages inherent to conventional POx systems (i.e., high oxygen consumption in comparison to an ATR and higher capital expenditures in the form of expensive boilers, and the like.

With reference to FIG. 1, a related art ATR system for generating syngas is shown. Hydrocarbon feedstock stream (1) is mixed with hydrogen (2) and then pre-heated to a temperature ranging from 600-725° F. in heating coils (102) and then preheated hydrocarbon stream (5) is fed to desulfurizer (105). Amount of hydrogen mixed with hydrocarbon is generally in 2-3% of hydrocarbon feed on a volumetric basis and it is used for aiding reactions within desulfurizer. Desulfurized hydrocarbon stream (8) is mixed with steam (35) and a mixed feed (10) is preheated to 700 to 950° F. in heating coils (107). The ratio of steam to hydrocarbon (by volume) could vary from 0.4 to 1.5 (i.e., steam/carbon ratio). Pre-heated mixed feed (12) is fed to a pre-reformer (110), where any $C_2+$ hydrocarbons are reacted with steam so as to convert them into mixture of $H_2$, CO and $CH_4$. Pre-reformed feed stream (14) is further heated to 1000-1200° F. in heating coils (112) within fired heater (100) and then fed to ATR (120) as pre-heated pre-reformed feed (16). Oxygen needed in the ATR is produced by air separation unit ("ASU") (130). Air feedstock stream (21) is separated into oxygen stream (24) and nitrogen (31) in ASU (130). Oxygen is pre-heated to a temperature ranging from 200 to 400° F. in oxygen preheater (135) and preheated oxygen (25) is also fed to the ATR (120). At the heart of the autothermal reforming process is an ATR unit operation (120) that combines a partial oxidation (POx) step and a catalytic reforming step. Within ATR (120), preheated pre-reformed feed (16) and oxygen (25) react to produce a syngas mixture (20) comprising $H_2$, CO, $CO_2$, steam, any unconverted $CH_4$ and other trace components. Specifically, the feed (16) first reacts with oxygen (25) in a POx step to consume all the oxygen and release heat. The remaining hydrocarbons in the feed are then reformed autothermally (not catalytically) with $CO_2$ and $H_2O$ present in the mixture. Since the reforming reactions are endothermic this non-catalytic reforming results in a reduction in gas temperature. As the reaction cools, the rates of reaction ("kinetics") slow down causing a kinetic limit to the achievable hydrocarbon conversion. To overcome this kinetic constraint, the still hot, reactive, mixture is fed to a catalyst which promotes reforming to achieve a near equilibrium degree of reforming. Due to the nature of the catalyst bed, it is critical that soot not enter the catalyst as it could cause fouling. Therefore, the conditions in the non-catalytic zone of the reactor must be maintained to prevent soot at the entrance to the catalyst. This can be accomplished by preventing soot from forming in the first place, or by promoting soot gasification reactions that would consume any soot formed before the gas reaches the catalyst. For this reason a conventional ATR requires a pre-reformer (110) to convert higher hydrocarbons, which may be prone to sooting in the POx step, to methane. Further the ATR may use steam injection at higher levels than needed in the catalytic reforming step just to reduce soot formation and enhance soot oxidation.

Syngas (20) exits the ATR at a temperature of 1800-1900° F. and at pressure ranging from 350-550 psia. Syngas (20) is then passed through process gas boiler (150) boiler feed water heater (155) and water heater (160) in sequence to recover thermal energy contained in syngas for steam generation. Temperature of syngas exiting the process gas boiler ranges from 550 to 700° F. Steam is typically generated at 350 to 750 psia, however, it can be generated at higher pressure if desired. Finally, syngas is cooled to 80 to 110° F. in a cooler (165) and sent to a condensate separator (170) to separate any condensate. Syngas (32) is then routed to a downstream process for either making chemicals such as methanol or Fischer Trope liquids or sent to a purification process for separating syngas into hydrogen and carbon monoxide. Any residual fuel stream from the downstream process is combined with make-up hydrocarbon fuel stream to form a fuel stream for the fired heater. Burning of fuel in the fired heater provides heat for various heating coils disposed within the fired heater. Process water (50) is combined with condensate (52) and heated in water heater (160) to a temperature of 200-210° F. Heated water is fed to deaerator (140) to remove any dissolved gases. Boiler feed water (55) from deaerator (140) is pumped to desired pressure (generally >450 psia) and heated to temperature that is 10 to 50° F. below the boiling point of water and sent to steam drum (125). Hot boiler feed water stream (60) from steam drum (125) is circulated through process gas boiler (150) to generate steam. A portion of saturated steam (62) from steam drum is superheated in heating coils (114). The superheated steam (35) is used in the reforming process. The remainder of saturated steam (70) is exported.

Turning to FIG. 2, a related art partial oxidation process for generating syngas is depicted. Hydrocarbon feedstock stream (1) is mixed with hydrogen (2) and pre-heated to 450-725° F. in hydrocarbon heating device (104) and the preheated hydrocarbon stream (5) is fed to desulfurizer device (105). Desulfurized hydrocarbon stream (8) along with oxygen stream (24) from the ASU (130) is fed to the POx reactor (115). Syngas (20) from the POx reactor exits at a temperature of 2500 to 2700° F. and at pressure ranging from 350-550 psia. Syngas stream (20) may contain some soot due to cracking of hydrocarbons within the POx reactor. Due to high temperature and potential presence of soot, a specialized boiler called syngas cooler (152) is required to cool syngas and generate steam. If steam has no value, syngas cooler can be replaced by quench vessel (not shown) to cool syngas using direct contact with water. Partially cooled syngas (22) at 550 to 750° F. from syngas cooler (152) is used to preheat hydrocarbon feedstock in the hydrocarbon heating device (104). Syngas stream (23) is then routed and processed in a soot scrubber (154). The soot scrubber includes a venturi scrubber for contacting syngas with large quantity of water, a contact tower for additional scrubbing section to remove residual soot from syngas and separating soot containing water from syngas and pump for circulating water. Soot free syngas (26) at 275 to 350° F. is then routed through a water heater (160) and cooler (165) to cool the syngas (30) to 80-110° F. and sent to the condensate separator (170). The syngas product (32) from condensate separator is sent to the downstream process. Process water (50) is combined with condensate (52) and heated in water heater device (160) to a temperature ranging from 200-210° F. Heated water is fed to deaerator (140) to remove any dissolved gases. Boiler feed water (55) is pumped to desired pressure (generally >450 psia) and sent to syngas cooler (152) to generate steam. Optionally, boiler feed water can be heated (not shown) close to its boiling point against partially cooled syngas prior to feeding it to syngas cooler.

While the partial oxidation system also produces syngas with low $H_2$:CO ratio in the range of about 1.5 to 2.5, the oxygen consumption in the POx reactor is about 25% higher than the ATR system for a comparable quantity of syngas. High grade heat at the exit of the POx reactor is either used for steam generation or rejected to atmosphere via quench cooling. Therefore, in order to take advantage of the high temperatures (~2600° F.) at the exit of the POx reactor, an expensive boiler (i.e., syngas cooler) is necessary.

In a conventional ATR the burner is designed to rapidly mix the feed(s) and oxygen, often using swirl and other mixing enhancement strategies. These strategies make staging the burner difficult, if not impossible. In other words, in the related art designs all the feed streams are rapidly mixed with the oxygen without the ability to feed different streams into different parts of the flame. For instance, in the related art U.S. Pat. No. 7,255,840 owned by the assignee of the present invention, this rapid mixing was used to mix the hot oxygen-containing gas with the hydrocarbon feed to reduce the mixture temperature below the ignition temperature without igniting the mixture, thereby feeding an oxygen and hydrocarbon containing mixture to the catalyst bed.

In contrast, the HOB/ATR reactor of the integrated system of the invention uses a different mixing strategy. A portion of the fuel is burned in an oxygen stream upstream of a nozzle. The resulting 'hot oxygen' stream exits the nozzle and mixes quickly with surroundings. Since the mixing method is that of a simple reacting jet, it is possible to control how different streams get mixed into the reactive portion. In the present invention, the HOB/ATR reactor ignites the oxygen and hydrocarbon containing mixture to perform partial oxidation reactions prior to the mixture entering the catalyst bed. Therefore, the HOB is designed to mix the streams more slowly than that in the related art to ensure ignition and avoid soot formation.

To overcome the disadvantages of the related art, such as soot formation, high oxygen consumption and the need for expensive boilers (e.g., syngas coolers), it is an object of the present invention to integrate an HOB with an ATR reactor in the syngas generation system. It is another object of the invention, to eliminate the pre-reformer and the fired heater. By using a catalyst bed to reform a portion of natural gas by using high grade heat, oxygen consumption per unit volume of syngas will be reduced. In addition, exit temperature from such a reactor will be below a temperature of ~2000° F. and will make it possible to use less expensive process gas boiler. It is yet another object of the invention, to improve the conventional ATR process by replacing the burner in the ATR by HOB and enable reduction in pre-reformer and fired heater sizes. Further object of the invention is to enable use of unconventional fuels in a conventional ATR process by employing HOB in the ATR reactor.

Other objects and aspects of the present invention will become apparent to one of ordinary skill in the art upon review of the specification, drawings and claims appended hereto.

SUMMARY OF THE INVENTION

According to an aspect of the invention, unit operation within a system for generating syngas is provided. The unit operation includes:
 a hot oxygen burner assembly integrated with an auto thermal reactor for receiving a first stream of fuel and oxygen in the hot oxygen burner to combust said fuel and generate a hot oxygen jet;
 introducing a hydrocarbon stream in proximity to the exit of the hot oxygen burner wherein said exit is disposed within the auto thermal reactor; igniting the hydrocarbon stream with hot oxygen, performing partial reforming of the hydrocarbon in a non-catalytic zone of the auto thermal reactor, and completing the reforming in a catalytic reaction zones of the of the auto thermal reactor, thereby forming a syngas which exits the reactor at a temperature below 2000° F. and with minimal soot formation.

In another aspect of the invention, an integrated system for generating syngas, including:
 providing a hydrocarbon feed stream without pre-reforming and/or heating said hydrocarbon feed stream;
 splitting said hydrocarbon feed stream between a fuel stream directed to the hot oxygen burner assembly integrated with an auto thermal reactor and a hydrocarbon feed stream where said fuel stream is combusted with oxygen in the hot oxygen burner assembly of an autothermal reactor to form a hot oxygen jet;

mixing the hydrocarbon feed stream with steam, and introducing said mixture of hydrocarbon feed in a non-catalytic region of the auto thermal reactor wherein the mixture of hydrocarbon feed is substantially entrained in the hot oxygen jet; igniting the hydrocarbon stream with hot oxygen to create a reactive jet, thereby performing partial reforming of the hydrocarbon in a non-catalytic zone of the auto thermal reactor; and further reforming the hydrocarbon in a catalyst bed of the auto thermal reactor to generate syngas.

In yet another aspect of the invention, an integrated system for generating syngas is provided, which includes:

providing a main hydrocarbon feed stream without pre-reforming and/or heating said main hydrocarbon feed stream;

splitting the main hydrocarbon feed stream into three fractions, wherein the first fraction forms a fuel stream, the second fraction forms a first feed stream, and the third fraction forms a second feed stream;

directing the fuel stream to the hot oxygen burner assembly integrated with an auto thermal reactor and a hydrocarbon feed stream where said fuel stream is combusted with oxygen in the hot oxygen burner assembly of an autothermal reactor to form a hot oxygen jet;

routing the first feed stream to the exit of the hot oxygen burner wherein said exit is disposed within the auto thermal reactor, wherein the mixture of hydrocarbon feed is substantially entrained in the hot oxygen jet;

igniting the hydrocarbon stream with hot oxygen to create a reactive jet, performing partial reforming of the hydrocarbon in a non-catalytic zone of the auto thermal reactor, mixing the second feed stream with steam and routing mixture such that second feed stream mixture is entrained into the reactive jet after the first stream is predominantly entrained; and further reforming the hydrocarbon in a catalyst bed of the auto thermal reactor to generate syngas.

In yet a further aspect of the invention, an integrated system for generating syngas is provided. The system includes:

providing a main desulfurized hydrocarbon feed stream split into at least two hydrocarbon streams wherein a first hydrocarbon stream is routed to the hot oxygen burner and utilized therein as a fuel which is mixed with oxygen to combust said fuel and generate a hot oxygen jet;

routing the second hydrocarbon stream to a fired heater and pre-reforming the second hydrocarbon stream into a heated pre-reformed hydrocarbon stream;

routing the heated pre-reformed hydrocarbon stream through the fired heater to increase the temperature further, and thereafter introducing the heated pre-reformed hydrocarbon stream in close proximity to the hot oxygen burner wherein heated pre-reformed hydrocarbon feed is substantially entrained in the hot oxygen jet to create a reactive jet, thereby performing partial reforming of the hydrocarbon in a non-catalytic zone of the auto thermal reactor; and completing the reforming in a catalytic reaction zones of the of the auto thermal reactor, thereby forming a syngas.

BRIEF DESCRIPTION OF THE DRAWINGS

The objects and advantages of the invention will be better understood from the following detailed description of the preferred embodiments thereof in connection with the accompanying figures wherein like numbers denote same features throughout and wherein.

DETAILED DESCRIPTION

The present invention provides for a system and method of integrating an HOB, such as the one developed by the assignee of the current invention, into an ATR reactor to design a syngas generation system that minimizes capital expenditure by either eliminating some of the process units or by reducing the sizing thereof. The "HOB/ATR," as utilized herein, will be understood to be a single unit operation, which is at times referred to as a hot oxygen burner assembly integrated with an auto thermal reformer or simply as an HOB-based reactor. The HOB's ability to control mixing in the ATR reactor such that ignition of the oxygen-containing and hydrocarbon containing streams and subsequent partial oxidation reactions are achieved and soot formation is minimized is leveraged by integrating it into the ATR reactor. In addition, the system developed does not require a pre-reformer and a fired heater, thereby simplifying the syngas generation system. The utilization of a catalyst bed to reform a portion of hydrocarbon feed by employing high grade heat results in a reduction of oxygen consumption per unit volume of syngas generated compared to the related art POx system. As utilized herein, hydrocarbon shall be understood to mean a natural gas feed, or a refinery-off gas containing various hydrocarbons as well as hydrogen, CO and $CO_2$ or the like. Further, the exit temperature from an HOB/ATR reactor is below ~2000° F. and advantageously the syngas generation system utilizes a far less expensive process gas boiler.

In the present invention, various streams, process conditions, and unit operations in common to the exemplary embodiments (and denoted by the same numerals) will be omitted for the sake of simplicity. In addition, the following terms shall be defined as follows: "total stoichiometric ratio" or ("total SR") shall mean moles of oxygen supplied to process/moles of oxygen required to completely combust hydrocarbons supplied for syngas conversion. It should be noted that in calculation of total SR, only those hydrocarbons that are supplied for syngas conversion are accounted and any hydrocarbons that are used as fuel in fired heater are not counted; "burner stoichiometric ratio" or "burner SR" shall mean moles of oxygen supplied to burner/moles of oxygen required to completely combust hydrocarbons supplied to the burner.

Figure 2:
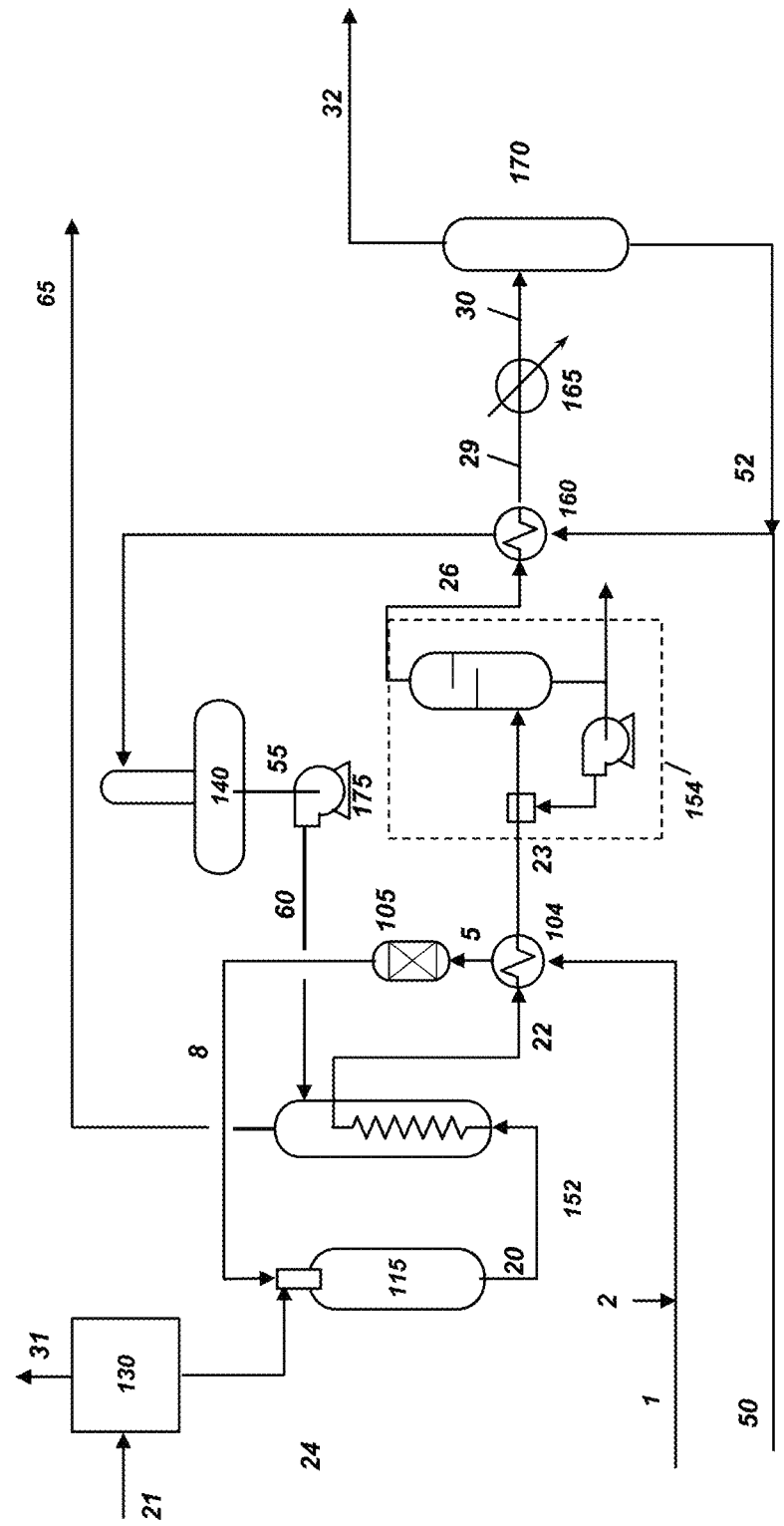
FIG. 2 process flow diagram for a related art POx reactor based system for generating syngas.
Figure 3:
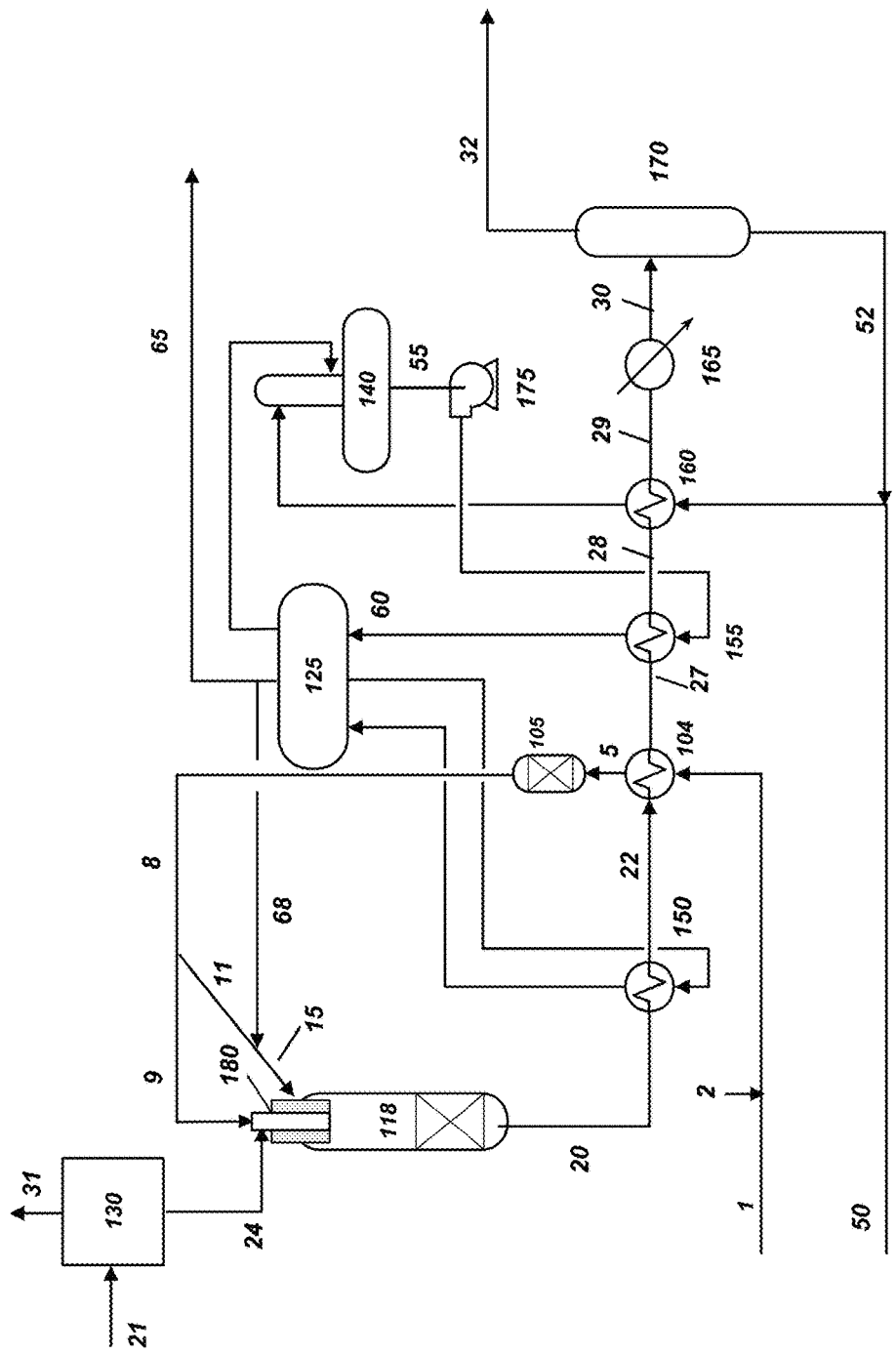
FIG. 3 depicts a process flow diagram of the present invention where an HOB is integrated with the ATR based reactor system for generating syngas. The system generates syngas without employing pre-reformers and fired heater.
Figure 3A:
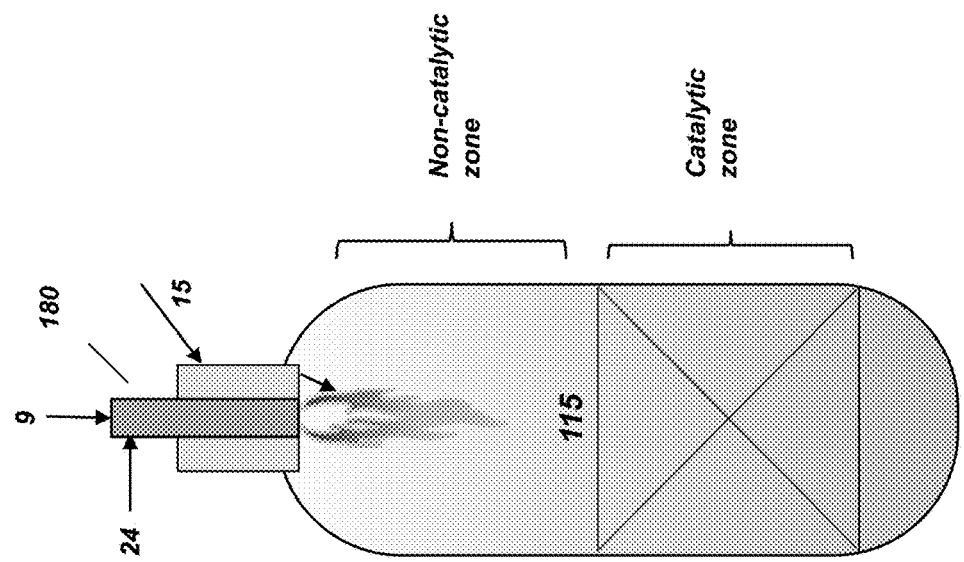
FIG. 3A depicts a sketch of an HOB/ATR reactor used for the process shown in FIG. 3.

Now with reference to FIG. 3, an exemplary embodiment of the invention where the HOB-based ATR system is presented. FIG. 3A shows a sketch of an HOB/ATR reactor (118) to show non-catalytic and catalytic reaction zones of the reactor and entry locations of various feeds to the reactor. This embodiment has several advantages over the related art discussed above. Compared to the system of FIG. 2 wherein the integrated system includes either a conventional or an HOB-based partial oxidation unit, the design of process gas boiler is simplified due to lower inlet temperature (1900° F. vs. 2600° F.) and minimization of soot in the syngas. The soot scrubber is not needed due to minimization of soot formation. Compared to the system of FIG. 1 wherein an autothermal reformer is employed, the fired heater and pre-reformer are not needed due to unique design of burner used in the HOB/ATR reactor that minimizes soot formation without the use of pre-reforming.

Specifically, in the exemplary embodiment of FIG. 3, hydrocarbon feedstock stream (1) is pre-heated to 450-725° F. in hydrocarbon heating device (104) and the preheated hydrocarbon stream (5) is routed to desulfurizer device (105) to form hydrocarbon feed stream (8). In this exemplary embodiment of the invention main hydrocarbon feed stream (8) is split into two separate streams referred to as fuel stream (9) and feed stream (11). Fuel stream (9), usually amounting to about 5-10% of main feed stream (8), is combusted with oxygen (24) by HOB (180) to generate a reactive hot oxygen jet. The amount of fuel (9) fed to HOB is such that burner SR value is between 3 and 6. The combustion product from HOB is a hot oxygen jet that contains mainly oxygen, $CO_2$ and $H_2O$. The feed stream (11) is combined with a steam stream (68) from the steam drum (125) and the combined mixed feed (15) is introduced in close proximity to the HOB (180). One way to ensure that mixed feed (15) is introduced in close proximity to the HOB is by providing an annular section around HOB as shown in FIG. 3A. Other option is to provide feed ports in the HOB/ATR reactor close to where HOB penetrates the reactor (not shown). The amount of oxygen is adjusted such that total SR for the reactor is between 0.28 and 0.33. Thus, oxygen supplied is 0.28 to 0.33 times the amount needed for complete combustion of stream 8. The reaction between hot oxygen jet and combined mixed feed (15) in a non-catalytic zone of the reactor generates syngas. Mixing the streams in the non-catalytic zone in this manner, the streams (9) and (15) are mixed sufficiently quick to avoid soot formation by the hydrocarbons in the reactor, but sufficiently slow to avoid soot formation by cracking of the hydrocarbons in the hot gas stream. The syngas than enters the catalyst bed where further reforming takes place. The syngas (20) exits the reactor at about 1800 to 1900° F. and at about 350 to 550 psia. The syngas composition depends on relative amounts of hydrocarbon feed stream (8), oxygen (24) and steam stream (68) are supplied in the system. Generally, the range of concentrations of various components on a molar basis could be ranging from 40 to 60% for hydrogen, 20 to 35% for CO, 10 to 25% for $H_2O$, 1 to 7% for $CO_2$, 0 to 2% of $CH_4$ and <1% other components including nitrogen, argon, $NH_3$, and HCN. The lower exit temperature from the reactor (118), enables use of a steam generation system comprising process gas reboiler (150) and steam drum (125) that is similar to that in embodiment of FIG. 1 and significantly less expensive compared to more expensive syngas cooler (152) of the embodiment of the related art shown in FIG. 2. In addition, it eliminates the need of pre-reformer (110) or the fired heater (100) of the related art embodiments in FIG. 1 or the soot scrubber (154) in the related art embodiment of FIG. 2, thereby reducing capital expenditure. Partially cooled syngas (22) at 550 to 750° F., from process gas boiler (150) is used to preheat hydrocarbon feed in the hydrocarbon heating device (104). Syngas stream (27) is then routed to a boiler feed water heater (155) to preheat boiler feed water to about 10 to 50° F. below its boiling point. Syngas is further cooled through water heater (160) and cooler (165). The cooled syngas (30) is separated in a condensate separator to generate syngas product (32) for further use in a downstream process.

Figure 4:
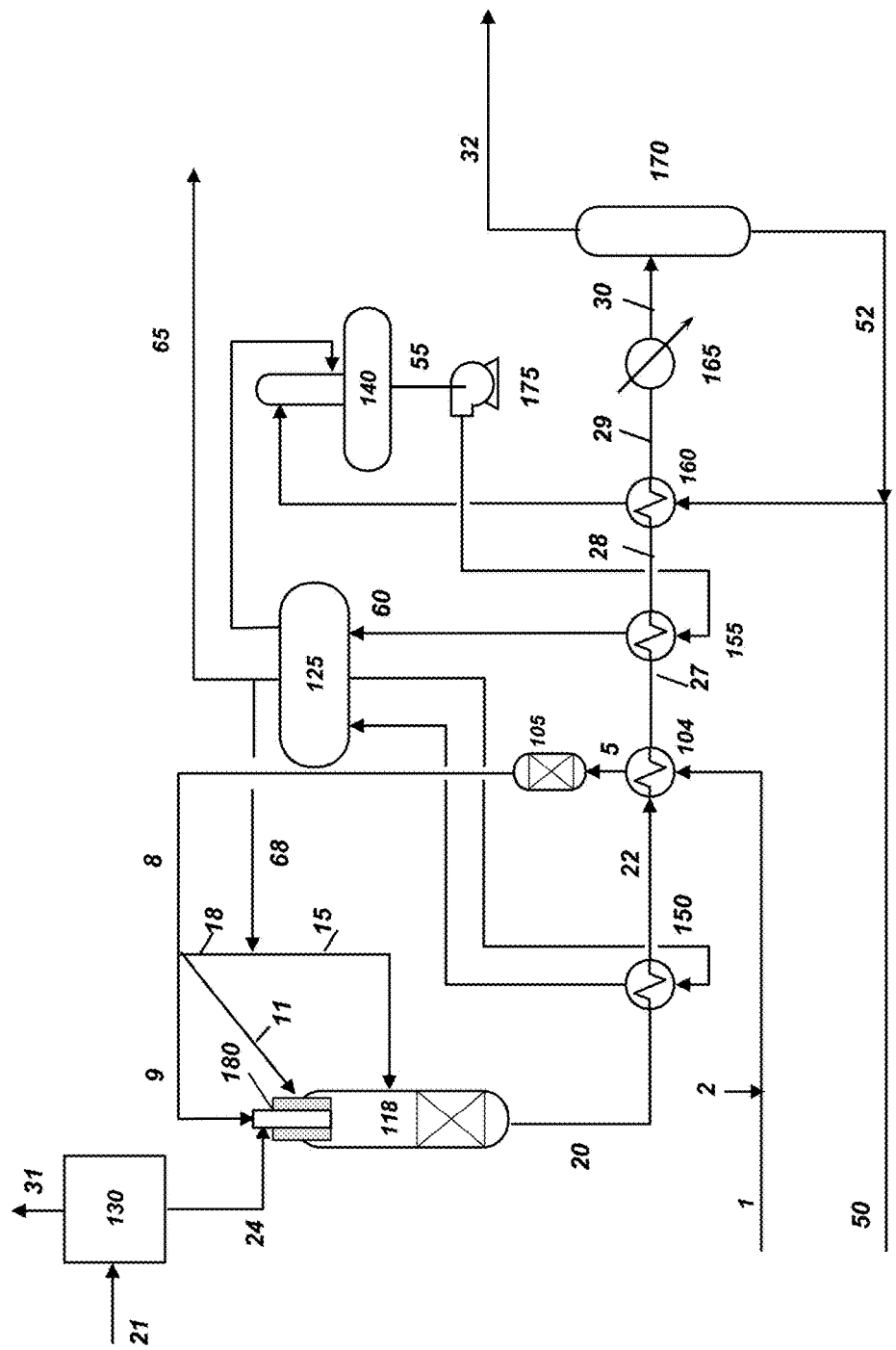
FIG. 4 depicts a process flow diagram of another embodiment of the present invention where an HOB is integrated with the ATR based reactor system for generating syngas. The system generates syngas without employing pre-reformers and fired heater and two hydrocarbon containing streams are introduced in two different locations of an HOB/ATR reactor.
Figure 4A:
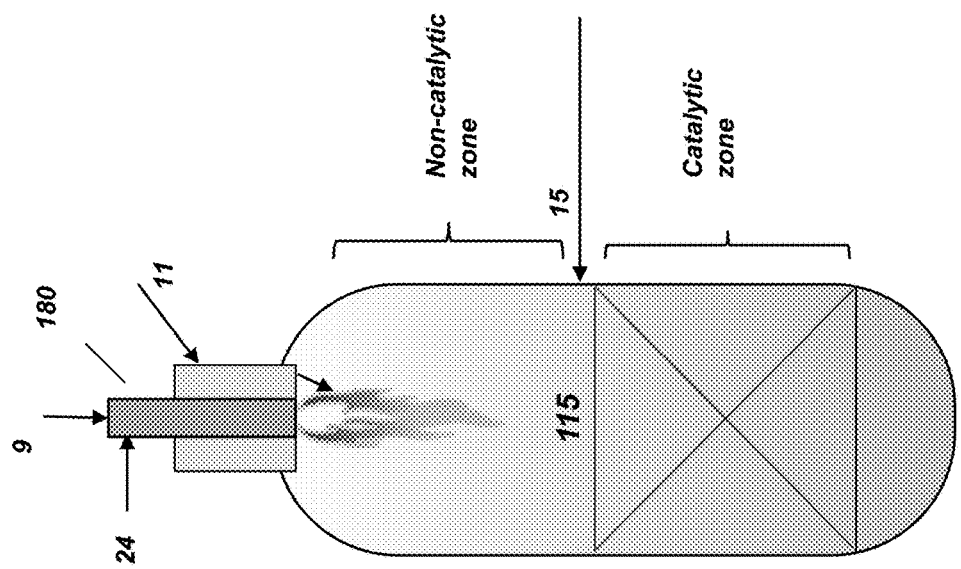
FIG. 4A depicts a sketch of an HOB/ATR reactor used for the process shown in FIG. 4.

FIG. 4 depicts an alternative exemplary embodiment, in which main hydrocarbon feed stream (8) is split into three fractions. One fraction forms first fuel stream (9) with flow ranging from about 5-10% of the main hydrocarbon feed flow of stream (8). Separately, a second fraction forms a first feed stream (11) for reactor with flow of 50 to 85% of main hydrocarbon feed stream (8). The third fraction forms a second feed stream (18) with flow of sufficient quantity to achieve the total SR desired by the operator. This second feed is combined with steam (68) to form a second feed stream (15) for the reactor. First fuel stream (9) is introduced into the HOB along with oxygen (24) to form a hot oxygen stream and first feed stream (11) is introduced into a section closest to the nozzle of the HOB (180) in reactor (118) such that this first feed stream (11) is preferentially entrained into the hot gas jet over second feed stream (15). The first feed stream (11) is ignited by the hot oxygen stream to create a reactive jet, partially reforming the hydrocarbon in a non-catalytic zone of the auto thermal reactor. The second feed stream (15) is introduced after first feed stream (11) has been predominantly entrained into the reactive jet. One option for introducing second feed stream (15) is just upstream of catalyst bed in the HOB/ATR reactor (118) as shown in FIG. 4A. In this manner, the total SR value in the non-catalytic reaction zone of the reactor would be similar to a conventional HOB reactor at 0.35 to 0.37 and syngas exiting the non-catalytic reaction zone would contain minimal soot. Thus, the soot is minimized by mixing the streams sufficiently quick to avoid soot formation by hydrocarbons in the reactor, but slow enough to avoid soot formation by cracking of the hydrocarbons in the hot gas stream, as described in detail in U.S. Pat. No. 9,540,240 B2, which is incorporated herein in its entirety.

The syngas temperature toward the end of the non-catalytic zone (i.e., in proximity to the non-catalytic and catalytic zone interface) would be 2500 to 2700° F. This syngas and second feed stream (18) are mixed just upstream of the catalyst bed and temperature of the syngas decreases to below 2100° F. as a result. This syngas then enters the catalyst zone, where thermal energy from the syngas aids in endothermic reforming of hydrocarbons in the second feed (18). The syngas exiting the reactor (118) is similar in temperature, pressure and composition to those described earlier for FIG. 3. The total SR value for the entire reactor (non-catalytic and catalytic zones) when all the hydrocarbon containing stream (9), (11) and (18) are considered would be similar to that of embodiment of FIG. 3 at 0.28 to 0.33.

In the event that steam has no other use in the system, the embodiments of FIGS. 3 and 4 are envisioned where the system configuration for the embodiments of FIGS. 3 and 4, steam generation equipment process gas boiler (150) and steam drum (125) are replaced by a quench vessel (not shown), which utilizes direct contact with water. Partially cooled syngas (22) at 550 to 750° F., from process gas boiler (150) is used to preheat hydrocarbon feed in the hydrocarbon heating device (104). Syngas stream (27) is then routed to a boiler feed water heater (155) to preheat boiler feed water to about 10 to 50° F. below its boiling point. Syngas is further cooled through water heater (160) and cooler (165). The cooled syngas (30) is separated in a condensate separator to generate syngas product (32) for further use in a downstream process.

Figure 1:
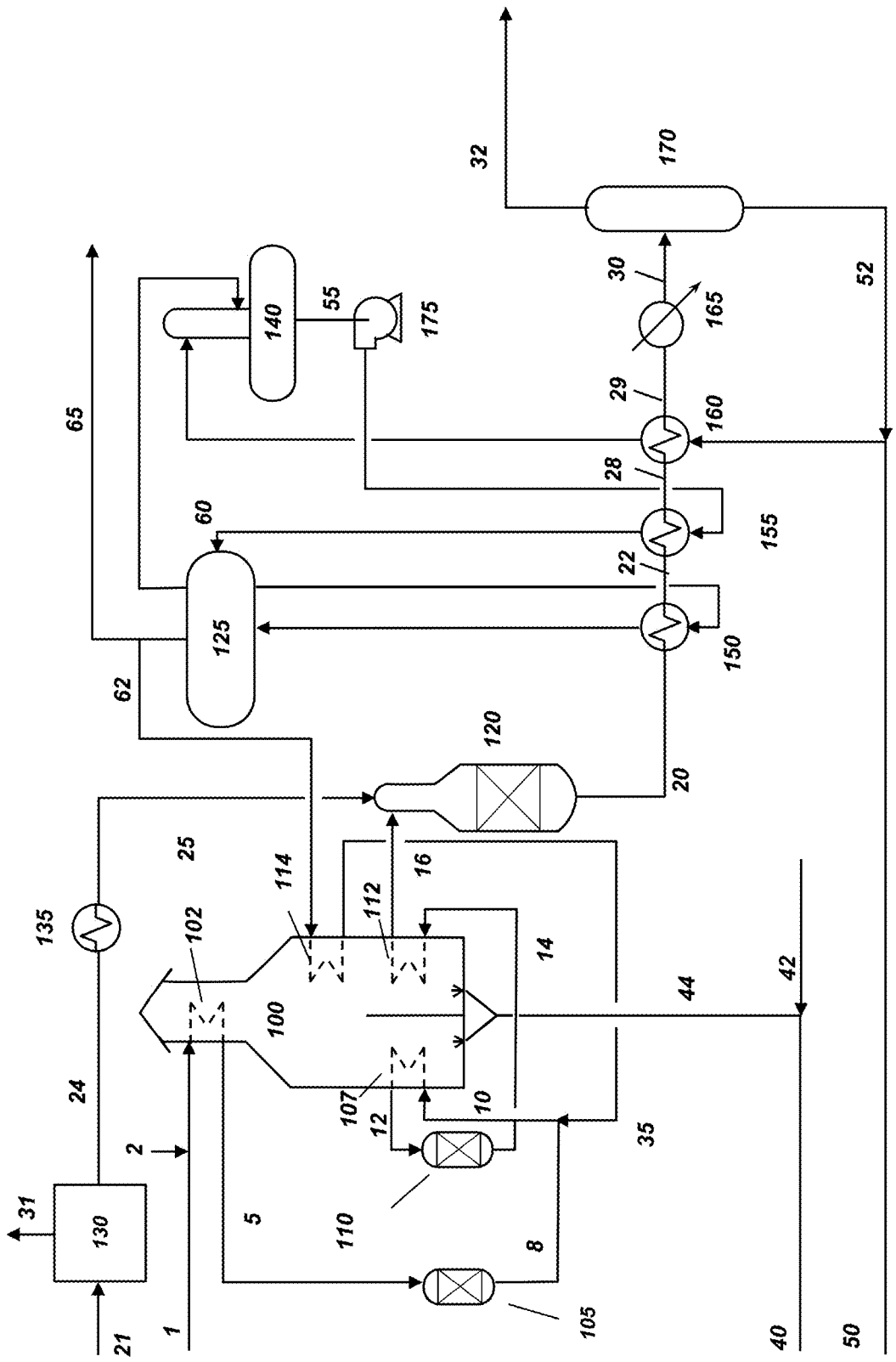
FIG. 1 is a process flow diagram for a related art ATR reactor based system for generating syngas.

While FIGS. 3 and 4 shows embodiments with significant simplifications in systems of prior art, the HOB/ATR reactor can be deployed in a conventional ATR like system of FIG. 1 to achieve improvements over the related art.

Figure 5:
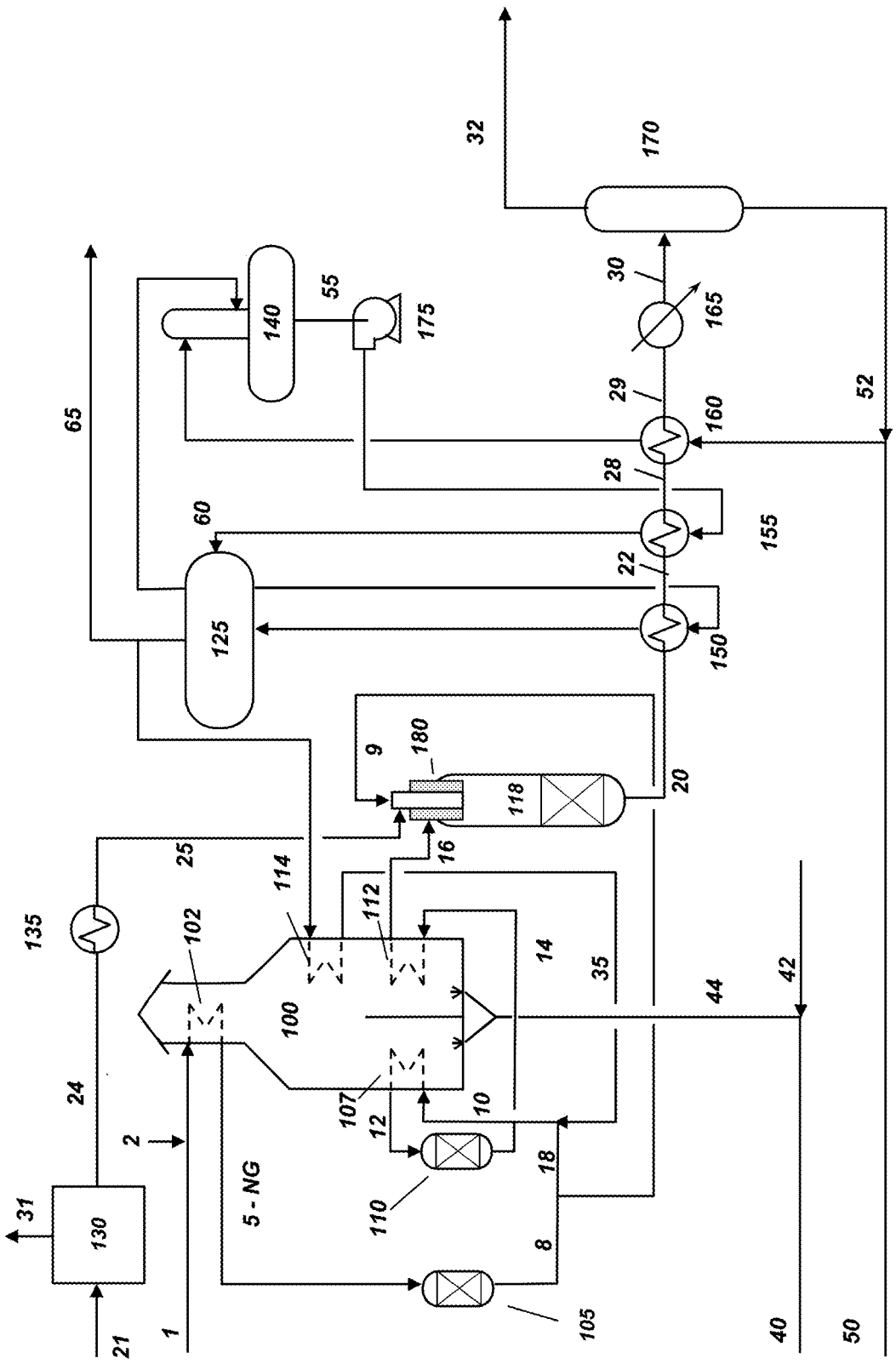
FIG. 5 depicts a process flow diagram of another embodiment of the present invention where an HOB is integrated with the ATR based reactor system for generating syngas, wherein fuel for HOB bypasses pre-reformer and fired heater.
Figure 5A:
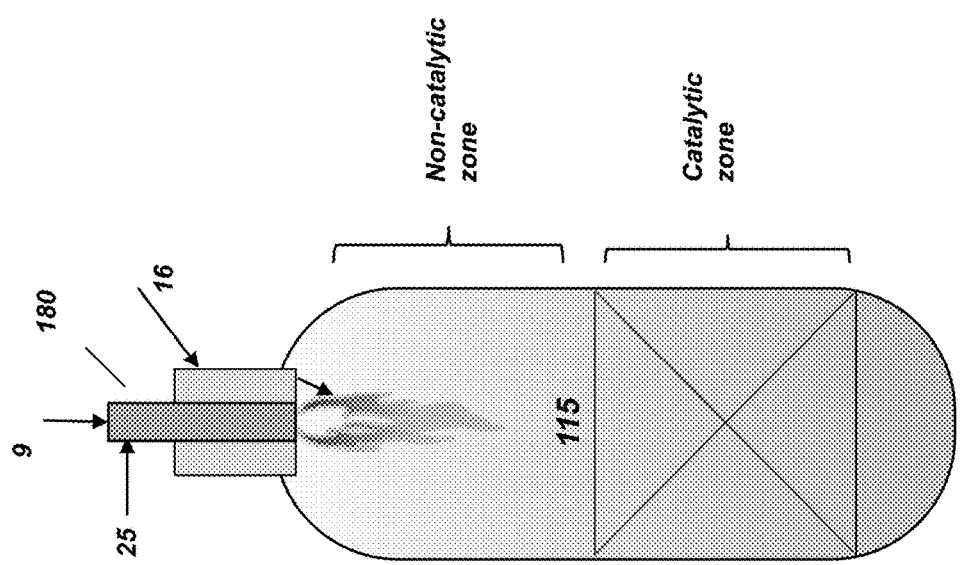
FIG. 5A depicts a sketch of an HOB/ATR reactor used for the process shown in FIG. 5.

As illustrated in FIG. 5, an alternative exemplary embodiment depicts a system/process configuration change to that of related art system of FIG. 1. With reference to FIG. 5A, a sketch of an HOB/ATR reactor (118) including HOB assembly (180) is depicted. Since the 'fuel' fed to the HOB (180) is completely combusted before it enters HOB/ATR (118) it is possible to use non-pre-reformed feed, or opportunity fuels as a fuel stream in HOB. As utilized herein, "opportunity fuels" will be understood to mean any hydrocarbon that can provide an economic advantage, including but not limited to refinery off-gases, tail gases, and other associated gases. As shown in FIG. 5, a portion of desulfurized NG (8) is split as a slip stream of hydrocarbon fuel (9), which bypasses pre-reformer (110) and is fed directly to HOB/ATR (118), specifically into HOB assembly (180). This would reduce the need for prereforming this portion of the total feed and associated heating duty within fired heater.

Figure 6:
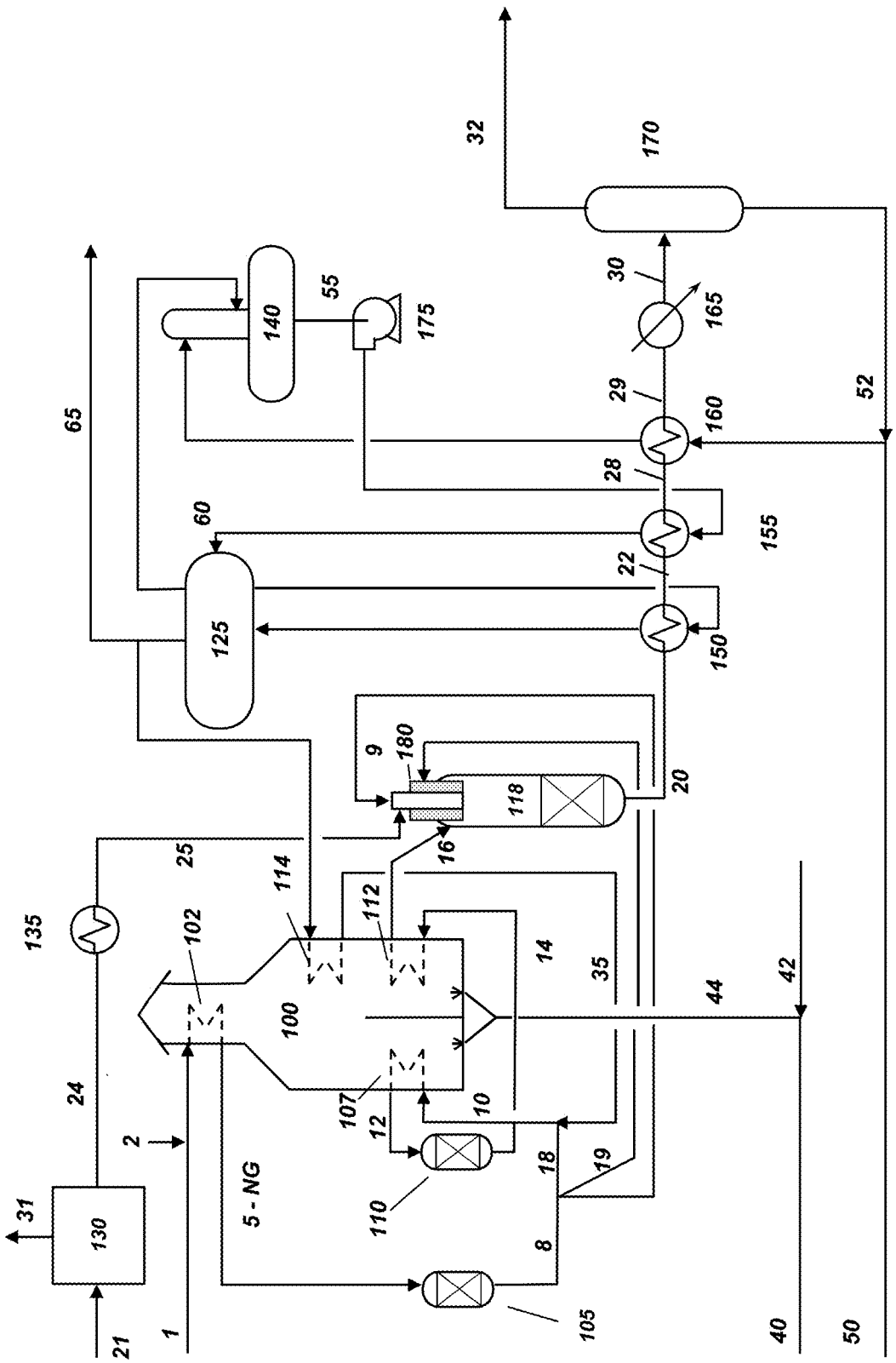
FIG. 6 depicts a process flow diagram of another embodiment of the present invention where an HOB is integrated with the ATR based reactor system for generating syngas, wherein fuel for HOB and first hydrocarbon feed bypass pre-reformer and fired heater.
Figure 6A:
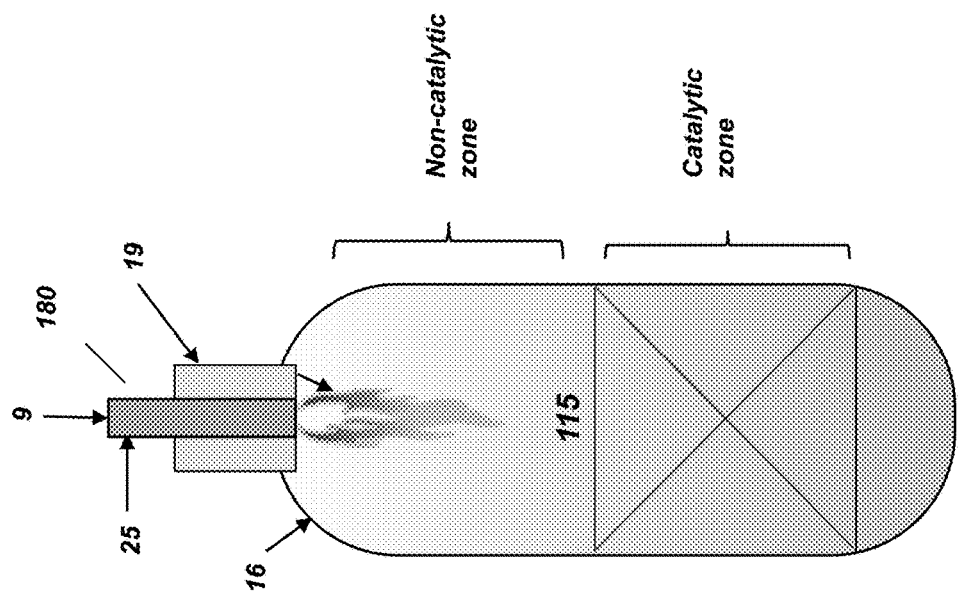
FIG. 6A depicts a sketch of an HOB/ATR reactor used for the process shown in FIG. 6.

In the exemplary embodiment of FIG. 6 a variation in the system of FIG. 5 is provided. Starting from the detailed showing of the HOB assembly (180) and the HOB/ATR reactor (118) in FIG. 6A the mixing can be carefully controlled within HOB assembly (180), it is possible to introduce a specific portion of the feed as first feed stream (19) a hydrocarbon gas split from the hydrocarbon main stream (8) is routed near the burner such that this feed is entrained into the jet prior to introducing the second feed stream (16) which consists of pre-reformed natural gas. Since reactions in this portion of the jet are fuel lean enough to avoid soot formation, it can be possible to feed unreformed feed into this region without forming soot. The remaining feed can then be mixed into the later part of the jet, after the first feed stream (19) is predominantly entrained in the jet, and take the mixture down to the final stoichiometric ratio. Specifically, with reference to FIGS. 6, in this embodiment, desulfurized hydrocarbon main stream (8) is split into three fractions: hydrocarbon fuel stream (9) which is fed to HOB/ATR (118) to support the fuel lean combustion, specifically into HOB assembly (180); stream of hydrocarbon (19) which is fed as first feed to HOB/ATR (118), specifically into close proximity of HOB assembly (180) and a stream of desulfurized hydrocarbon (18), which is first routed through fired heater (100). Desulfurized hydrocarbon feedstock stream (18) is mixed with steam stream (35) and processed through pre-reformer (110) and fired heater (100) as described with respect to the embodiment of FIG. 1 to generate pre-heated pre-reformed feed stream (16), which is fed to HOB/ATR (118) as second feed stream. In this embodiment the reaction of the hydrocarbon fuel stream (9) and the fuel lean combustion product from the HOB assembly (180) are not likely to form soot. Therefore, the pre-reformer duty can be reduced, and in some situations alternative fuels from within or outside the integrated system could be used, in essence reducing the size of the fired heater and/or the pre-reformer and enabling use of lower cost fuel and/or refinery off-gas streams.

Figure 7:
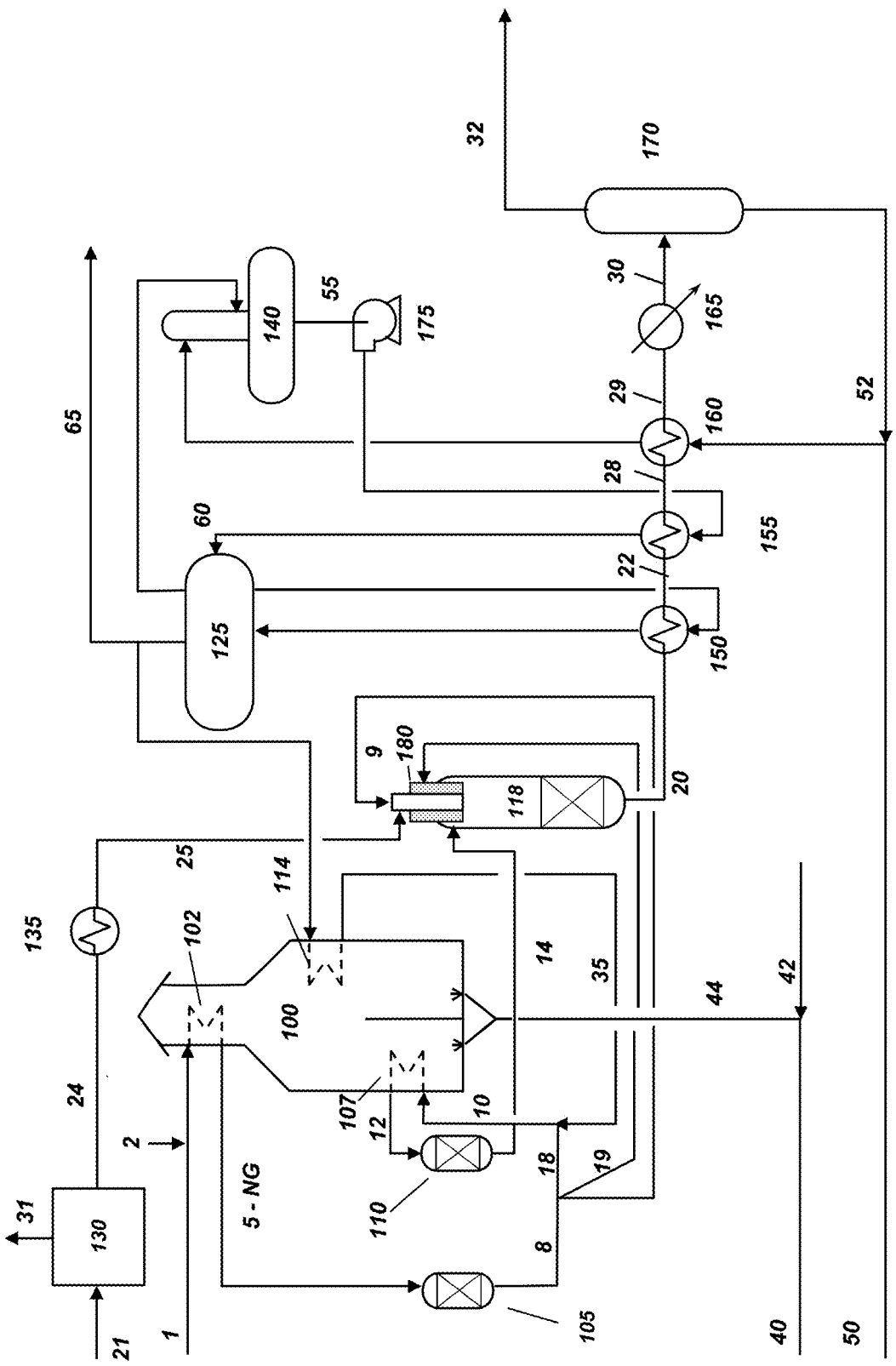
FIG. 7 depicts a process flow diagram of another embodiment of the present invention where an HOB is integrated with the ATR based reactor system for generating syngas, wherein fuel for HOB and first hydrocarbon feed bypass pre-reformer and fired heater and pre-reformed second feed for an HOB/ATR reactor bypasses fired heater.

In yet another exemplary embodiment and with reference to FIG. 7 in this configuration it is not necessary to preheat pre-reformed feed (14) prior to feeding it to HOB/ATR (118). Therefore, in this embodiment, pre-reformed hydrocarbon feed (14) is directly fed to HOB/ATR (118) a second feed. Thus, eliminating the preheating of this steam reduces the duty of the fired heater. In addition, the total SR is increased, thereby reducing the soot forming potential.

The invention is further explained through the following examples, which compare the related art embodiments with the various ones of the present invention, and those based on various embodiments of the invention, which are not to be construed as limiting the present invention.

EXAMPLES

Process simulations were carried out for various embodiments described above. Main feed and product streams conditions used in all simulations are listed in Table 1. Natural gas was used as a hydrocarbon feed in all the simulations. All the embodiments were compared for a fixed flow of 20 MMscfd for $H_2$+CO content in syngas product (32). Amounts of feed and product streams per unit volume of syngas varied between various embodiments as indicated in Table 2. Also, syngas compositions were somewhat different for different embodiments as indicated by $H_2$/CO ratios in Table 2.

TABLE 1

|  | HC feed (1) | Oxygen (24) | Syngas (32) | Export steam (65) |
|---|---|---|---|---|
| Temperature [F.] | 70.0 | 100.0 | 100.0 | 505.7 |
| Pressure [psia] | 613.5 | 585.0 | 461.5 | 716.7 |
| Mole Fractions |  |  |  |  |
| Methane | 0.905900 |  |  |  |
| Ethane | 0.036100 |  |  |  |
| Propane | 0.007800 |  |  |  |
| i-Butane | 0.003100 |  |  |  |
| n-Butane | 0.004500 |  |  |  |
| Nitrogen | 0.012595 |  |  |  |
| CO2 | 0.030000 |  |  |  |
| H2S = mercaptans | 0.000005 |  |  |  |
| Oxygen |  | 0.996 |  |  |
| Argon |  | 0.004 |  |  |
| H2O |  |  |  | 1.000 |

Table 2 summarizes key comparative parameters of syngas generation systems in the embodiments of FIGS. 1 through 7, detailed above. All the embodiments of this invention (FIGS. 3 through 7) achieves $H_2$/CO ratio of between 2.2 to 2.4. Embodiments of FIGS. 3 and 4 consume about the same NG while consuming ~10% less oxygen in comparison to relate art embodiment of FIG. 2. This improved performance is achieved by embodiments of FIGS. 3 and 4 while simultaneously reducing process complexity by eliminating soot scrubber and using a lower cost boiler when compared to FIG. 2. When compared to the related art embodiments of FIG. 1, the embodiments described with respect to FIGS. 3 and 4 consume slightly less NG and ~22% more oxygen while significantly lowering process complexity by eliminating fired heater and pre-reformer.

TABLE 2

| Embodiment | FIG. 1 (related art) | FIG. 2 (related art) | FIG. 3 | FIG. 4 | FIG. 5 | FIG. 6 | FIG. 7 |
|---|---|---|---|---|---|---|---|
| H2 + CO in SG, MMscfd | 20 | 20 | 20 | 20 | 20 | 20 | 20 |
| NG/(H2 + CO) | 0.388 | 0.380 | 0.377 | 0.382 | 0.391 | 0.396 | 0.395 |
| O2/(H2 + CO) | 0.200 | 0.272 | 0.245 | 0.246 | 0.204 | 0.209 | 0.226 |
| H2/CO ratio | 2.4 | 1.6 | 2.2 | 2.2 | 2.4 | 2.4 | 2.4 |
| Steam export, lb/hr | 27584 | 44281 | 30668 | 31068 | 29921 | 29738 | 29589 |
| Prereformer size | 1 | n/a | n/a | n/a | 0.95 | 0.68 | 0.68 |
| Fired heater size | 1 | n/a | n/a | n/a | 0.98 | 0.89 | 0.56 |
| Steam generation equipment | PGB | SG cooler | PGB | PGB | PGB | PGB | PGB |
| Soot scrubber required? | No | Yes | No | No | No | No | No |

Embodiments of FIGS. 5, 6 and 7 consumes slightly more NG and oxygen compared to the related art embodiment of FIG. 1 while achieving size reduction for the fired heater between 5% and 32% and that for the pre-reformer between 2% and 44%.

While the invention has been described in detail with reference to specific embodiments thereof, it will become apparent to one skilled in the art that various changes and modifications can be made, and equivalents employed, without departing from the scope of the appended claims.

What is claimed is:

1. A method for generating syngas in a thermal reactor, comprising:
    introducing a first stream of fuel and oxygen in a hot oxygen burner to combust said fuel and generate a hot oxygen jet having a burner stoichiometric ratio (SR) value between 3 and 6 wherein the hot oxygen burner is integrated with the auto thermal reactor;
    introducing a first hydrocarbon stream within a non-catalytic zone of the auto thermal reactor, wherein the first hydrocarbon stream is substantially entrained in the hot oxygen jet; reacting the first hydrocarbon stream with the hot oxygen jet, performing partial reforming of the hydrocarbon in the non-catalytic zone of the auto thermal reactor, and completing the reforming in a catalytic reaction zone of the auto thermal reactor, thereby forming a syngas which exits the reactor at a temperature below 2000° F. and with minimal soot formation.

2. The method of claim 1, wherein a first stream of fuel stream as an opportunity fuel.

3. The method of claim 1, further comprising:
    routing a second stream of hydrocarbon to upstream of the catalytic reaction zone of the auto thermal reactor.

* * * * *